United States Patent
Agarwal et al.

(10) Patent No.: US 6,920,326 B2
(45) Date of Patent: Jul. 19, 2005

(54) METHOD AND APPARATUS FOR RESTRICTING CALL TERMINATIONS WHEN A MOBILE UNIT IS ROAMING

(75) Inventors: Anjana Agarwal, Wheaton, IL (US); Terry Jacobson, Deerfield, IL (US); Michael Joseph Rudolph, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 653 days.

(21) Appl. No.: 09/845,488

(22) Filed: Apr. 30, 2001

(65) Prior Publication Data

US 2002/0068578 A1 Jun. 6, 2002

Related U.S. Application Data

(60) Provisional application No. 60/251,434, filed on Dec. 5, 2000.

(51) Int. Cl.[7] ................................................. H04Q 7/20
(52) U.S. Cl. ..................... 455/445; 455/433; 455/432.1; 455/435.1
(58) Field of Search ................................ 455/445, 433, 455/432.1, 435, 410, 414.1

(56) References Cited

U.S. PATENT DOCUMENTS

| | | | | |
|---|---|---|---|---|
| 5,469,496 A | * | 11/1995 | Emery et al. | 455/461 |
| 5,479,484 A | * | 12/1995 | Mukerjee et al. | 455/432.1 |
| 5,564,068 A | * | 10/1996 | Nguyen | 455/433 |
| 5,915,218 A | * | 6/1999 | Talagery et al. | 455/433 |
| 5,915,220 A | * | 6/1999 | Chelliah | 455/435.2 |
| 6,032,044 A | | 2/2000 | Simpson et al. | 455/433 |
| 6,044,269 A | * | 3/2000 | Talagery | 455/433 |
| 6,064,875 A | | 5/2000 | Morgan | 455/410 |
| 6,081,731 A | * | 6/2000 | Boltz et al. | 455/565 |
| 6,091,949 A | * | 7/2000 | Sanchez | 455/417 |
| 6,131,024 A | * | 10/2000 | Boltz | 455/405 |
| 6,141,549 A | * | 10/2000 | Nguyen | 455/433 |
| 6,151,495 A | * | 11/2000 | Rune | 455/426.1 |
| 6,233,447 B1 | * | 5/2001 | Tomoike | 455/411 |
| 6,259,914 B1 | * | 7/2001 | Koster | 455/432.1 |
| 6,311,055 B1 | * | 10/2001 | Boltz | 455/414.1 |
| 6,393,269 B1 | * | 5/2002 | Hartmaier et al. | 455/406 |
| 6,434,126 B1 | * | 8/2002 | Park | 370/328 |
| 6,453,174 B1 | * | 9/2002 | Cunningham et al. | 455/560 |
| 6,516,194 B2 | * | 2/2003 | Hanson | 455/433 |
| 6,556,818 B1 | * | 4/2003 | Meehan | 455/406 |

(Continued)

FOREIGN PATENT DOCUMENTS

GB      000762792 A2 * 12/1997 ............ H04Q/7/38

OTHER PUBLICATIONS

European Search Report dated Mar. 27, 2002; application No. EP 01 30 5271, Examiner Weinmiller, J.; Place of Search—The Hague.

*Primary Examiner*—William Trost
*Assistant Examiner*—Sharad Rampuria
(74) *Attorney, Agent, or Firm*—John B. MacIntyre; Steven R. Santema

(57) ABSTRACT

The present invention provides a method and apparatus for restricting call terminations for a roaming mobile unit. A serving MSC, which is an MSC providing call processing a mobile unit that is not the home MSC of the mobile unit, sends a registration notification request to the home location register (HLR). The HLR retrieves the termination access code parameter from the HLR and sends it to the serving MSC. The termination access code parameter includes a value that indicates if the mobile unit is allowed to roamer port calls. The parameter is stored at a VLR associated with the serving MSC. When a call request comes in to the serving MSC and requests a roamer port call with the mobile unit, the serving MSC checks the value of the termination restriction code to determine if it should terminate, or complete, the call.

6 Claims, 2 Drawing Sheets

U.S. PATENT DOCUMENTS 6,615,041 B2 * 9/2003 Adamany et al. ........ 455/432.1
6,615,042 B1 * 9/2003 Britt et al. .................. 455/433
6,725,037 B1 * 4/2004 Grootwassink ............. 455/433
2003/0114160 A1 * 6/2003 Verkama et al. ............ 455/445

* cited by examiner

100

200

METHOD AND APPARATUS FOR RESTRICTING CALL TERMINATIONS WHEN A MOBILE UNIT IS ROAMING

CROSS-REFERENCE TO RELATED APPLICATIONS

This application claims the benefit of U.S. Provisional Application No. 60/251,434, filed Dec. 5, 2000.

FIELD OF THE INVENTION

The present invention relates generally to wireless communication systems, and more particularly to a method and apparatus for restricting call terminations when a mobile unit is roaming.

BACKGROUND OF THE INVENTION

In current wireless communication systems, a location request message is typically sent to a Mobile Switching Center (MSC) of the home system of the mobile unit when a call arrives for the mobile unit via an MSC's roamer access port. This requires intersystem messages to be exchanged when the home system determines that calls to that mobile unit via a roamer access port are not permitted. For example, if call terminations to a specific mobile unit registered in a visited system are prohibited, a location request message would still be initiated to the home system. Consequently, network and system resources are used unnecessarily, even when the home system has determined a priori that terminations to the mobile unit are not permitted. Further, when Wireless Intelligent Network (WIN) service applications, such as prepaid, are not part of a call (e.g. A RAN call), the potential for uncharged or fraudulent service exists.

FIG. 1 depicts a ladder diagram 100 of a call flow for denying access to a roaming mobile unit in accordance with the prior art. This method of mobile unit call restriction when roaming is done by sending a message from the serving MSC to the HLR and requesting the status of a termination restriction code field. This mechanism requires an extra SS7 message to be launched for every switch based RAN call. Consequently, the prior art method requires additional messages be sent, which can delay the start of a call for a roaming mobile unit, and consumes additional system resources.

The communication system of the prior art includes an originating system (home) MSC, a Home Location Register (HLR), a Visitor Location Register (VLR), a serving (visited) MSC, and a mobile unit. The mobile unit preferably subscribes to the originating MSC as its home system, and a subscriber record is thereby included in the HLR. In the call flow of FIG. 1, the determination of the termination access code parameter does not occur until after a call request for a mobile unit on a RAN port arrives. Therefore, the serving MSC must send a location request message asking for the status of the termination access code parameter every time a roamer port call occurs.

When traveling outside of the coverage area of the originating MSC, the mobile unit is considered to be roaming. The mobile unit can then communicate with the serving MSC, which will create a user record associated with the mobile unit and store the user record in the VLR.

Upon entering the service area covered by the serving MSC and registering, the VLR sends a registration notification message (REGNOT) 101 to the HLR. Registration notification message 101 includes the identification number of the mobile unit, as well as other parameters.

The HLR retrieves the subscriber record of the mobile unit and sends a registration notification response message 103 back to the VLR. In the prior art, the termination restriction code parameter is by default set to allow Roamer Access Number (RAN) calls to the mobile unit. This can be done by setting the value of the termination restriction code parameter to the value of "unrestricted". The unrestricted value is the default, and therefore at this point, without further verification, calls to the mobile unit via the RAN port of the serving MSC are allowed.

A RAN call request 105 now arrives at the serving MSC for the mobile unit. The serving MSC must now determine whether the mobile unit is permitted by its originating MSC to receive RAN calls. In the prior art, this is done when a call request is received. Further, in the prior art, this is done every time a call request is received for a mobile unit utilizing a RAN port. The serving MSC must now send another message, location request message 107, to the HLR.

Location request message 107 includes, among other fields, a request for the value of the termination restriction code parameter, typically stored in the Termination Access Type field. If the termination restriction code parameter field is set to deny (RAN) calls to the mobile unit, as is indicated in FIG. 1 by the value "TerminationsDenied", RAN call request 206 is denied and is not delivered to the mobile unit. If the termination restriction code parameter had been set to deny (RAN) calls to the mobile unit, preferably by having a value other than "TerminationsDenied", RAN call 105 would have been delivered to the mobile unit.

Therefore, a need exists for a method and apparatus for restricting call termination when a mobile unit is roaming. Further, a need exists for a method and apparatus for restricting call termination that eliminates the chance of fraud and utilizes fewer system resources while minimizing the number of messages traversing the communication system.

BRIEF SUMMARY OF THE INVENTION

It is an object of the present invention to provide a method and apparatus for restricting call terminations for mobile units that are roaming. As used herein, the term "termination" refers to the reception of a call request by a target subscriber or the completion of the call to the targeted subscriber. The term "roaming" refers to a mobile unit using or requesting services of a cellular network other than the home network of the mobile unit. Roaming typically requires the mobile unit to be in communication with a Mobile Switching Center (MSC) that is not its home MSC. However, it is also contemplated that a mobile unit can "roam" within its home system. In such a case, the mobile unit would be connected to the home MSC via a RAN number associated with the home MSC. In this manner, the mobile unit could be prevented from utilizing services that the home MSC would want to prevent mobile units from other systems from using, such as a prepaid service.

The present invention provides a method for allowing a home system to automatically block roamer port calls to specific mobile units. This is preferably accomplished by adding a new value for the Termination Restriction Code parameter.

The present invention further provides a method that enables the serving system to deny access to roamer access port calls to specific mobile units.

The present invention provides the serving MSC with information so that the serving MSC may restrict a call termination when a Roamer Access Number (RAN) call is attempted. This is preferably accomplished without requiring subsequent messaging to determine if the mobile unit has RAN permissions.

In the preferred embodiment of the present invention, a previously defined parameter, the TerminationRestrictionCode, is used to convey to the serving MSC that RAN Access is denied. An additional value will be assigned to this parameter to separate it from Termination denied (value=1) and Unrestricted (value=2) values. The TerminationRestrictionCode is an optional parameter passed within a mobile unit's profile during registration, or whenever a mobile unit profile is requested.

By providing an easy and standard mechanism for blocking fraudulent calls, an application, such as a prepaid application, can proceed without sophisticated call-time workarounds for RAN restrictions. The present invention allows the service provider to provision the parameter in the Home Location Register (HLR) as part of prepaid subscriber setup, and remove the need for call-time interactions to handle the call.

Thus, the present invention provides an efficient and cost-effective solution to the problem of fraudulent calls placed in a prepaid cellular system. The present invention provides a method and apparatus for not allowing termination of roamer port calls for a roaming mobile unit. The present invention eliminates the step of messaging from a serving MSC to an originating system when the originating system does not want to allow roamer port calls to be terminated by a specific subscriber. The present invention thereby reduces intersystem messages and decreases the likelihood of fraudulent calls occurring on serving systems by roaming mobile units. Further, the present invention reduces network traffic in a communication system by blocking SS7 messages sent to an originating system's HLR when a call arrives for a mobile unit via the roamer port.

DETAILED DESCRIPTION OF THE INVENTION

Figure 1:
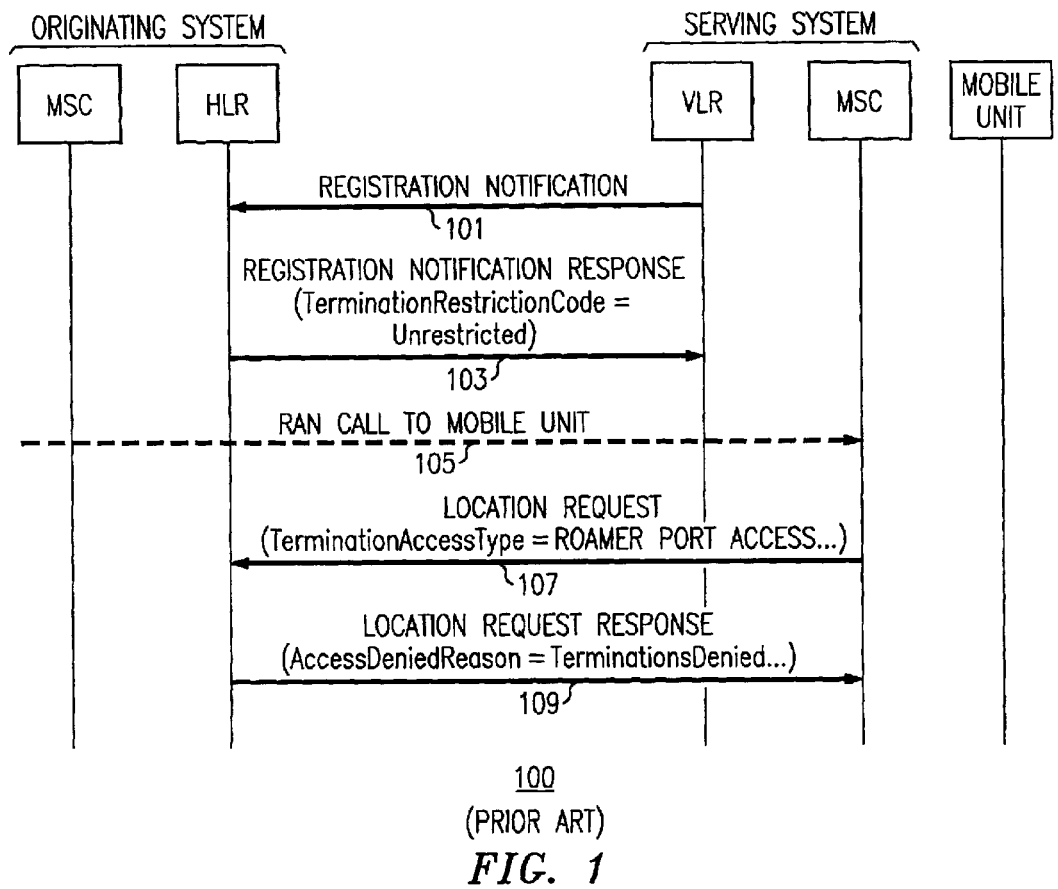
FIG. 1 depicts a ladder diagram of a call flow for denying access to a roaming mobile unit in accordance with the prior art.
Figure 2:
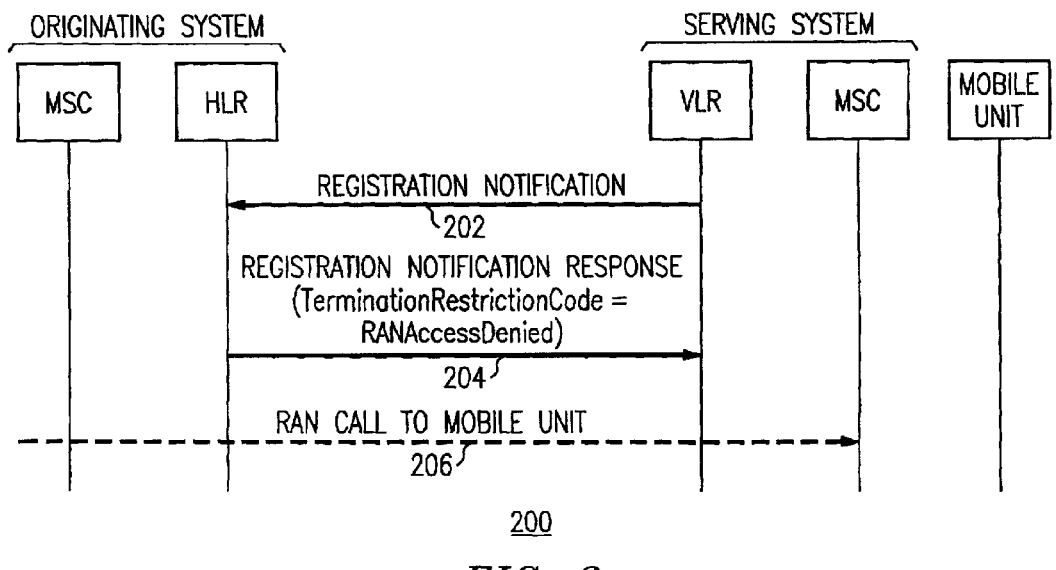
FIG. 2 depicts a ladder diagram of a call flow for denying access to a roaming mobile unit in accordance with the present invention.
Figure 3:
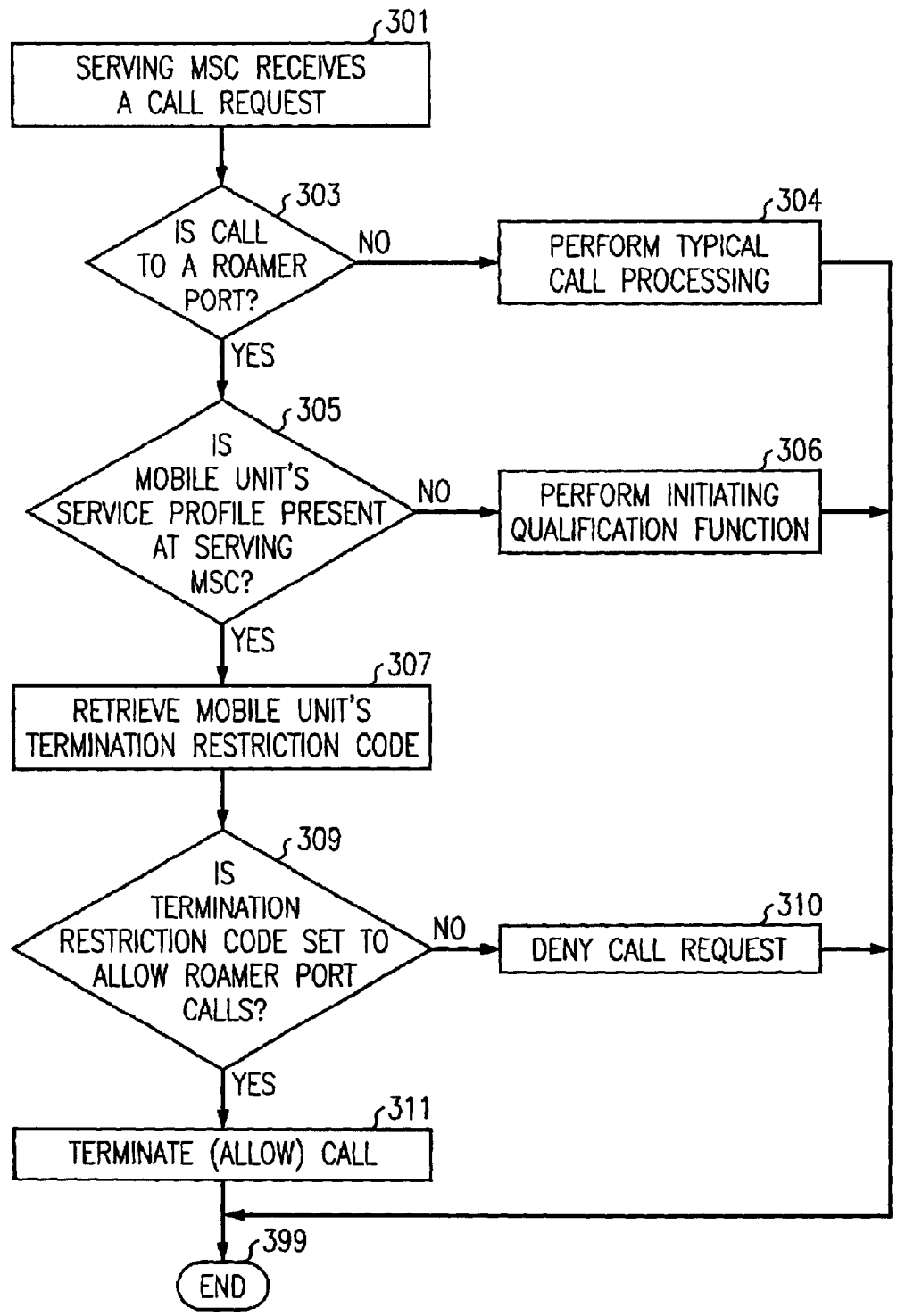
FIG. 3 depicts a flowchart of a method for restricting call terminations for a roaming mobile unit in accordance with the present invention.

The present invention can be better understood with reference to FIGS. 2 and 3. FIG. 2 depicts a ladder diagram 200 of a call flow for denying access to a roaming mobile unit in accordance with the present invention. The communication system includes an originating system (home) MSC, a Home Location Register (HLR), a Visitor Location Register (VLR), a serving (visited) MSC, and a mobile unit. The mobile unit preferably the originating MSC as its home system, and the HLR as its home registration database. The communication system is preferably an Advanced Mobile Phone Service (AMPS)/Personal Communications Service (PCS) wireless system, but could alternately be any wireless communication system, including but not limited to Global System for Mobile Communications (GSM), Code Division Multiple Access (CDMA), Time Division Multiple Access (TDMA), cdma2000, Wideband CDMA (W-CDMA), and UWC-136, a Wideband TDMA technology.

When traveling outside of the coverage area of the originating MSC, the mobile unit is considered to be roaming. The mobile unit can then communicate with the serving MSC, which will create a user record associated with the mobile unit and store the user record in the VLR.

The call flow for the scenario of the mobile unit receiving a call over a RAN port while roaming to the serving MSC is as follows. Upon entering the service area covered by the serving MSC and registering, the VLR sends a registration notification message (REGNOT) 202 to the HLR. Registration notification message 202 includes the identification number of the mobile unit, as well as other parameters.

The HLR retrieves the subscriber record of the mobile unit and sends a registration notification response message 204 back to the VLR. Utilizing the present invention, a termination restriction code parameter is set to deny Roamer Access Number (RAN) calls to the mobile unit. In the preferred embodiment, the termination restriction code parameter is a TerminationRestrictionCode field that is set to the value RANAccessDenied, which indicates that the mobile unit cannot receive RAN calls while roaming. The subscriber record for the mobile unit, including the TerminationRestrictionCode field, is stored by the VLR.

A RAN call request 206 now arrives at the serving MSC for the mobile unit. The communication system knows, based upon the registration of the mobile unit, that the mobile unit is located within the coverage area of the serving MSC. The serving MSC receives RAN call request 206 intended for the mobile unit. The serving MSC retrieves the subscriber record associated with the mobile unit and retrieves from the subscriber record the value of the termination restriction code parameter. If the termination restriction code parameter field is set to deny (RAN) calls to the mobile unit, RAN call request 206 is denied and RAN call request 206 is not delivered to the mobile unit. If the termination restriction code parameter, preferably TerminationRestrictionCode, is not set to deny (RAN) calls to the mobile unit, preferably by being set to a value other than RANAccessDenied, RAN request 206 will be delivered to the mobile unit.

Therefore, the preferred embodiment of the present invention provides a faster access time for RAN calls for roaming mobile units. Further, the present invention allows for fewer system resources to be utilized and minimizes the likelihood of fraud occurring with roaming mobile units, such as with prepaid applications.

FIG. 3 depicts a flowchart 300 of a method for restricting call terminations for a roaming mobile unit in accordance with the present invention. In this embodiment, a mobile unit has roamed from its home coverage area supported by its originating (home) MSC to a roaming area supported by a serving MSC. In this embodiment, the roaming mobile unit is accessing the serving MSC via a roamer port, and will send a request for a call to the serving MSC.

The serving MSC receives (301) a call request from the roaming mobile unit. The call request may be for a prepaid call.

The serving MSC determines (303) if the call request has been received at a roamer port. If so, this indicates that the mobile unit receiving the request does not consider the serving MSC its home MSC. The serving MSC must then determine if the mobile unit receiving the call request is able to receive such call requests.

If the call request was not received at a roamer port, the serving MSC performs (304) typical call processing for the call request. This may include processing the call and allowing the mobile unit to terminate, or complete, the call. This could also include denying the call request for various reasons. The processing then ends (399).

If the call was received by the serving MSC at a roamer port as determined at step 303, the serving MSC determines (305) if the roaming mobile unit has a service profile stored at the serving MSC. The service profile is preferably received by the serving MSC from the VLR at the time that the roaming mobile unit enters the service area covered by the serving MSC. The service profile includes, among other things, a termination restriction code. The termination restriction code is a field that indicates whether the mobile unit associated with the termination restriction code is able to terminate calls at visited MSCs.

If the mobile unit does not have a service profile present at the serving MSC as determined in step 305, the serving MSC performs (306) initiating qualification function. This includes requesting and receiving a service profile for the roaming mobile unit from the HLR. The service profile preferably includes the mobile unit's termination restriction code. The process then ends (399).

If the mobile unit's service profile is present at the serving MSC as determined at step 305, the serving MSC retrieves (307) the mobile unit's termination restriction code. The termination restriction code is preferably comprises one byte, or octet, of information. In the preferred embodiment, a value of 1 indicates that call termination is denied, a value of 2 indicates an unrestricted value, and a value of 4 indicates that roamer port access is denied. It should be understood that different values could be chosen and still be used to represent the same information.

The serving MSC then determines (309) if the termination restriction code is set to allow roamer port access calls. If the value is set to the unrestricted value (in the preferred embodiment a value of 2), the mobile unit is allowed to terminate roamer port calls. If the mobile unit is not allowed to terminate roamer port calls as determined in step 309, the serving MSC denies (310) the call request received from the mobile unit. The mobile unit will be not be able to terminate roamer port calls if the termination restriction code is set to either the termination denied value or the roamer port access denied value. In the preferred embodiment, the termination denied value is "1", and the roamer port access denied value is "4", although other representations may be used to represent these values. The process then ends (399).

If the mobile unit is allowed to terminate roamer port calls as determined in step 309, the serving MSC terminates (311) the call request received from the mobile unit. In this manner, roamer calls for roaming mobile units are terminated, or completed, if the mobile unit has been indicated, preferably prior to the serving MSC receiving the call request, to be allowed to terminate roamer port call requests. The process of determining whether the mobile unit can terminate roamer port calls then ends (399).

Thus, the present invention provides a method and apparatus that solves a problem associated with the prior art. The present invention provides a method and apparatus for restricting call terminations when a mobile unit is roaming. By storing a call termination restriction code at the serving MSC, a check of this value does not need to be done each time a call request comes in for the roaming mobile unit. In this manner, messaging is made more efficient in the communication system.

The present invention is also easier to implement that the prior art for restricting RAN accesses in support of prepaid deployment. The present invention is also less bandwidth-intensive than current techniques utilized to solve the RAN fraud problem.

While this invention has been described in terms of certain examples thereof, it is not intended that it be limited to the above description, but rather only to the extent set forth in the claims that follow.

We claim:

1. In a wireless communication system including a mobile unit having roamed from an originating system to a serving system, the originating system including an originating mobile switching center (MSC) and the serving system including a serving MSC, a method comprising the steps of:

receiving, by the serving system from the originating system responsive to registering the mobile unit with the serving MSC, a termination restriction code parameter indicating whether Roamer Access Number (RAN) calls may be terminated at the mobile unit;

receiving, by the serving MSC sometime after receiving the termination restriction code parameter, a RAN call request for the mobile unit; and determining, by the serving MSC based on the termination restriction code parameter without requiring further message exchange with the originating system, whether to terminate the RAN call request to the mobile unit, the serving MSC denying termination of the RAN call request to the mobile unit if the termination restriction code parameter indicates that the mobile unit is not permitted to terminate RAN calls while roaming at the serving MSC.

2. The method of claim 1, wherein the step of determining comprises determining if the call request has been received for a roamer port on the serving MSC;

if the call request was received via a roamer port on the serving MSC, terminating the call request to the mobile unit if the termination restriction code parameter indicates that the mobile unit is permitted to terminate calls while roaming at the serving MSC.

3. The method of claim 1, wherein the step of receiving a RAN call request comprises receiving a call request for a prepaid call.

4. A mobile switching center comprising:

means for receiving responsive to registering a roaming mobile unit with the mobile switching center, a termination restriction code parameter indicating whether Roamer Access Number (RAN) calls may be terminated at the mobile unit;

means for receiving Roamer Access Number (RAN) call request for the roaming mobile unit;

means for determining if the RAN call request has been received for a roamer port on the mobile switching center;

means for terminating the call request at the roaming mobile unit if the call request was received via a roamer port on the mobile switching center and if the termination restriction code is set to allow roamer port access calls.

5. A mobile switching center in accordance with claim 4, wherein the means for receiving a RAN call request comprises means for receiving a call request for a prepaid call.

6. A mobile switching center in accordance with claim 4, further comprising means for denying termination of the call request if the termination restriction code is not set to allow roamer port access calls.

* * * * *